United States Patent
Huang

[11] Patent Number: 5,269,480
[45] Date of Patent: Dec. 14, 1993

[54] ADAPTOR FOR REWINDING OR FAST-FORWARDING AN 8 MM VIDEO TAPE IN A VIDEO HOME SYSTEM VIDEO TAPE REWINDER

[76] Inventor: Liang-Hou Huang, 10Fl.-1, No. 39, Sec. 2, Hsinsheng N. Rd., Taipei, Taiwan

[21] Appl. No.: 748,239

[22] Filed: Aug. 21, 1991

[51] Int. Cl.⁵ .................................. G11B 15/32
[52] U.S. Cl. ...................... 242/199; 242/200; 242/201; 360/94
[58] Field of Search ............ 242/199, 200, 201, 179; 360/94, 132

[56] References Cited

U.S. PATENT DOCUMENTS

| | | | |
|---|---|---|---|
| 3,777,073 | 12/1973 | Kokubo | 360/94 |
| 3,964,099 | 6/1976 | Sato | 360/94 |
| 4,074,876 | 2/1978 | Gourley | 242/199 |
| 4,206,487 | 6/1980 | Sato | 360/94 |
| 4,405,098 | 9/1983 | Spicer | 242/200 |
| 4,470,560 | 9/1984 | Yoneya et al. | 360/94 |
| 4,477,850 | 10/1984 | Ogata et al. | 360/94 |
| 4,562,497 | 12/1985 | Morinaga et al. | 242/199 |
| 4,579,295 | 4/1986 | Harada | 360/132 |
| 4,994,929 | 2/1991 | Chen | 360/132 |

FOREIGN PATENT DOCUMENTS

58-115649 7/1983 Japan .................... 360/94

*Primary Examiner*—Daniel P. Stodola
*Assistant Examiner*—John Q. Nguyen
*Attorney, Agent, or Firm*—Harness, Dickey & Pierce

[57] ABSTRACT

An adaptor for rewinding or fast-forwarding an 8 mm video tape in a video home system (VHS) video tape rewinder includes a housing having dimensions substantially the same as those of a VHS video tape and a transmission assembly in the housing. The housing has a central recess on an upper side thereof for accommodating the 8 mm video tape with two reels. After the adaptor is put in the VHS video tape rewinder, a driving rotor wheel of the VHS video tape rewinder drives the transmission assembly of the adaptor which in turn drives one of the reels of the 8 mm video tape.

6 Claims, 5 Drawing Sheets

ADAPTOR FOR REWINDING OR FAST-FORWARDING AN 8 MM VIDEO TAPE IN A VIDEO HOME SYSTEM VIDEO TAPE REWINDER

BACKGROUND OF THE INVENTION

The present invention relates to an adaptor for rewinding or fast-forwarding an 8 mm video tape in a Video Home System (VHS) video tape rewinder, i.e., an 8 mm video tape, after being put in the adaptor according to the present invention, can be rewound or fast-forwarded in a VHS video tape rewinder.

Almost every household has a VHS player since VHS tapes are quite common and cheap on the market. In some countries, people utilize an additional rewinder for rewinding or fast-forwarding VHS tapes, rather than directly rewinding or fast-forwarding VHS tapes in the VHS players themselves, which usually damages the magnetic tape of the VHS tapes. More and more people enjoy making videos with 8 mm cameras and making their own 8 mm video tapes. Although rewinders for 8 mm video tapes have been developed, such rewinders are expensive because 8 mm video tapes are not as popular as VHS tapes at the present time. It is, however, somewhat extravagant to own an additional 8 mm video tape rewinder after owning a VHS rewinder.

The present invention provides an adaptor for receiving an 8 mm video tape, so that the 8 mm video tape can be rewound or fast-forwarded in a VHS rewinder.

SUMMARY OF THE INVENTION

An adaptor according to the present invention includes a housing having dimensions substantially the same as those of a VHS tape and a transmission assembly in the housing. The housing has a central recess on an upper side thereof for accommodating an 8 mm video tape with two reels. After the adaptor is put in a VHS rewinder, a driving rotor wheel drives the transmission assembly of the adaptor, which in turn drives one of the reels of the 8 mm video tape.

Accordingly, it is a primary object of the present invention to provide an adaptor for receiving an 8 mm video tape to be rewound or fast-forwarded in a VHS rewinder.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
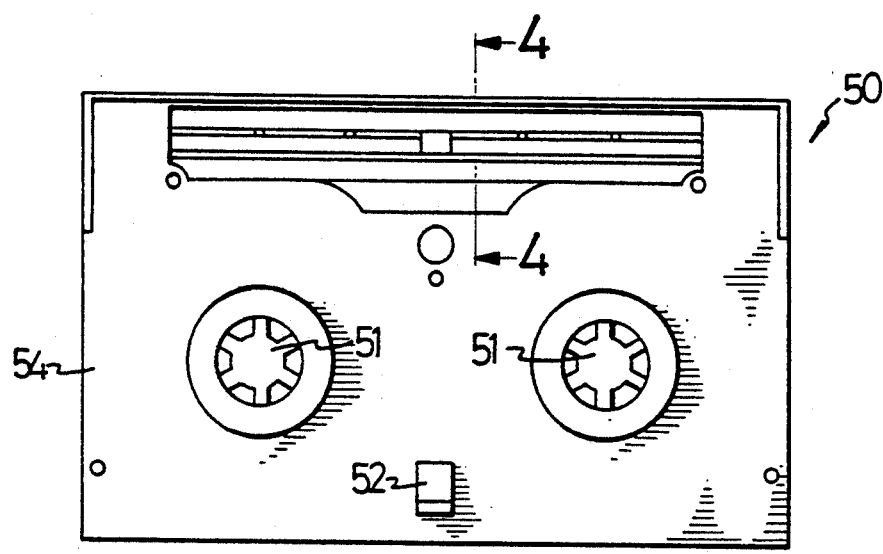
FIG. 1 is a bottom plan view of an 8 mm video tape.
Figure 3:
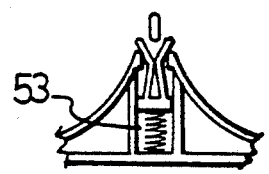
FIG. 3 is a fragmentary schematic view of the stop means in FIG. 2 in which the stop means is urged to allow rotational movement of the reels;.
Figure 2:
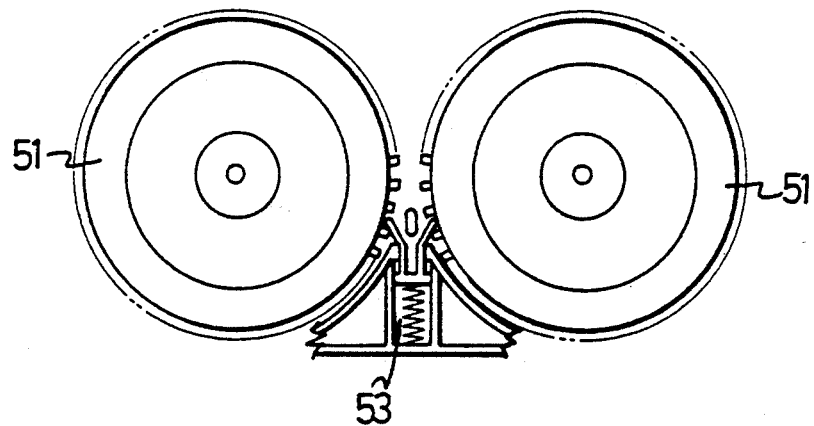
FIG. 2 is a fragmentary schematic view of the reels of the 8 mm video tape in which rotational movement of the reels is restrained by a stop means.

Referring to the drawings and initially to FIGS. 1 through 3 in which an 8 mm video tape 50 is shown, the 8 mm video tape 50 generally includes a casing 54, two reels 51, and an opening 52. A stop means 53 is provided in the casing 54, being accessible via the opening 52 for restraining rotational movement of the reels 51. Referring to FIG. 2, the reels 51 of the 8 mm video tape 50 cannot be rotated when the stop means 53 is in a status in this figure. When the stop means 53 is urged to a second status shown in FIG. 3, the reels 51 are free for rotational movement for rewinding or fast-forwarding the magnetic tape 57 in the casing 54 (cf. FIG. 4). Such a structure of the 8 mm video tape is conventional and thus will not be further described.

Figure 5:
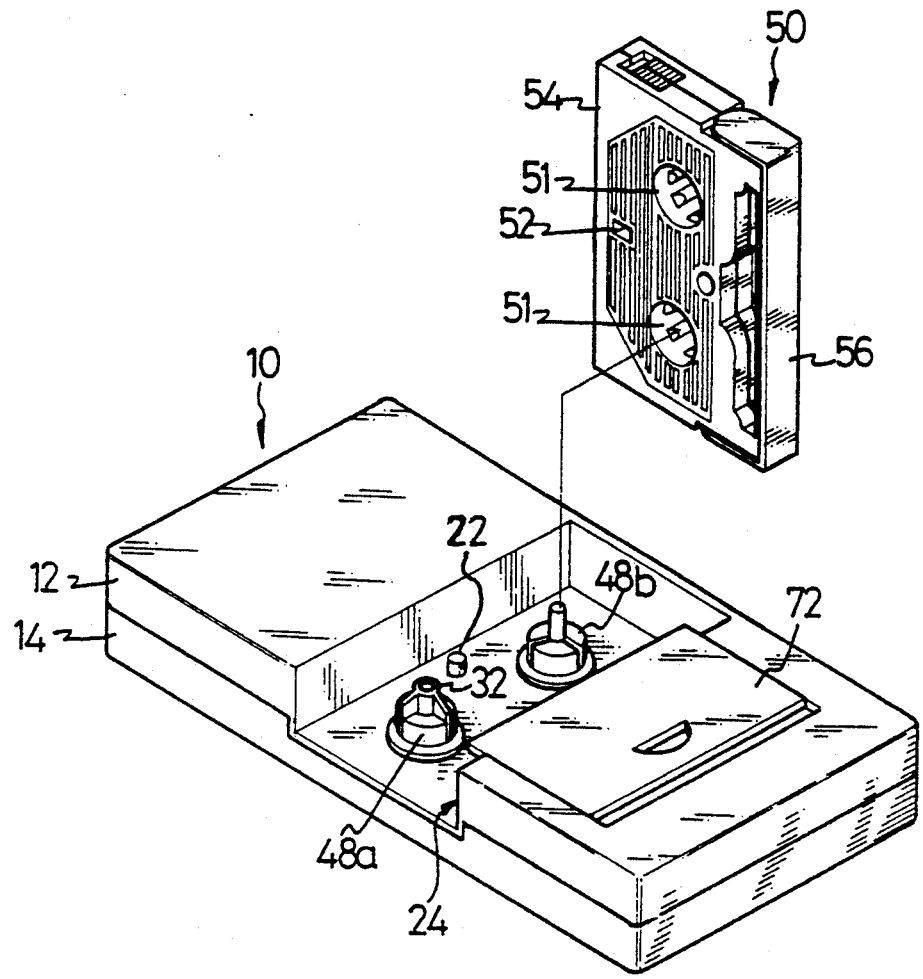
FIG. 5 is a schematic view of the 8 mm video tape and an adaptor according to the present invention.
Figure 6:
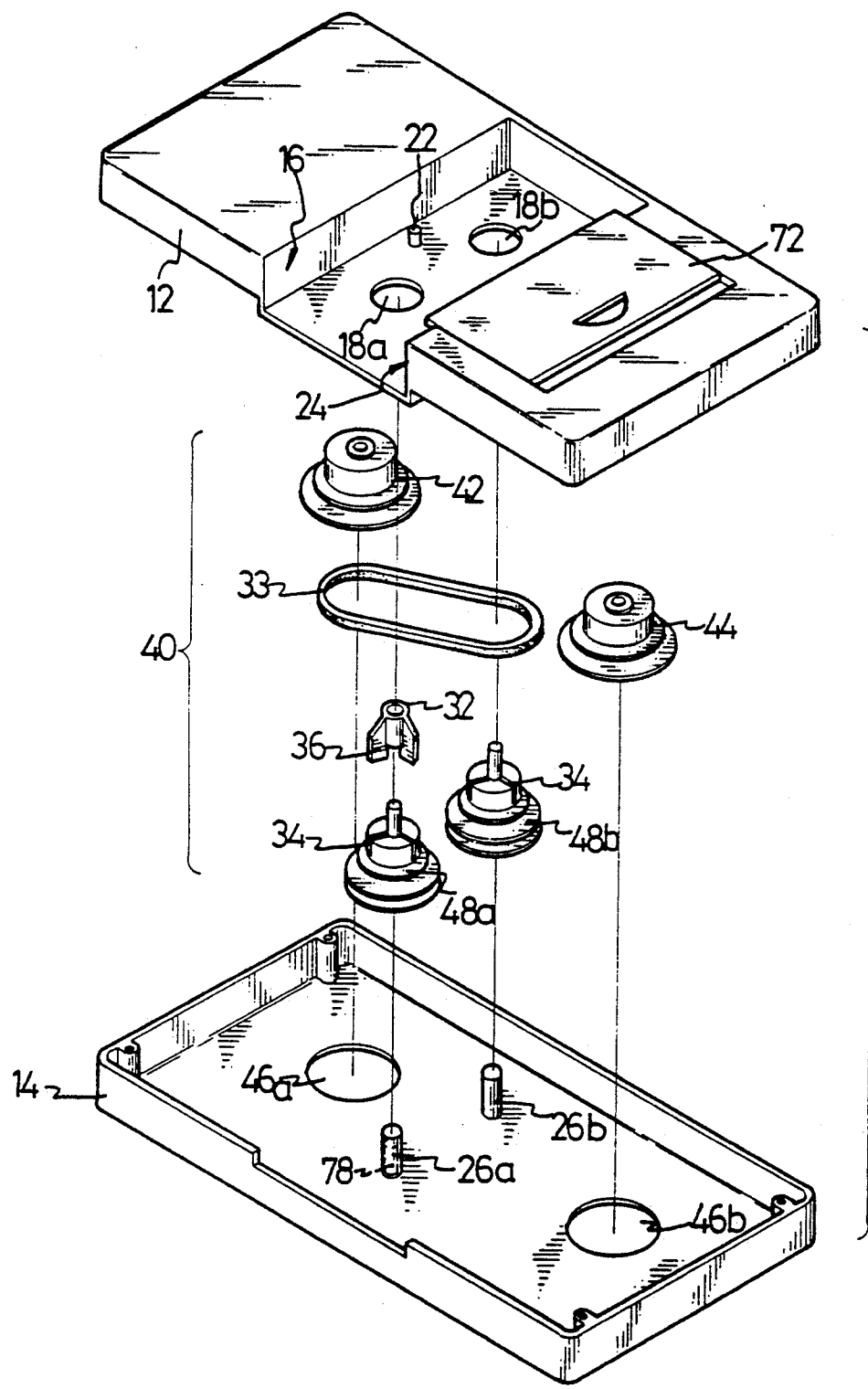
FIG. 6 is an exploded perspective view of the adaptor according to the present invention.

Referring now to FIGS. 5 and 6, an adaptor according to the present invention includes a housing 10 with dimensions substantially the same as those of a VHS tape and a transmission assembly 40 mounted in the housing 10. The housing 10 includes an upper housing 12 and a lower housing 14 being connected together by screws or other suitable means. The upper housing 12 has a central recess 16 on an upper side thereof for accommodating the 8 mm video tape 50. A first and second holes 18a and 18b are formed in a bottom surface of the central recess 16. An actuating member 22 is provided on the bottom surface of the recess 16 which passes through the opening 52 in the 8 mm video tape 50 when received in the recess 16, urging the stop means 53 to its second status, thereby allowing rewinding or forwarding of the 8 mm video tape 50. One of two lateral walls of the recess 16 which constitutes a middle portion of the side walls of the upper housing 12 is cut out to form an access 24, through which the 8 mm video tape 50 can be easily put into or removed from the recess 16.

A first and second rotor spindles 26a and 26b are separately provided at a middle portion of -,-the bottom surface of the lower housing 12. The first and second rotor spindles 26a and 26b respectively pass through the first and second holes 18a and 18b in the upper housing 12. A third and fourth holes 46a and 46b are formed on a bottom surface of the lower housing 14, which will be further discussed in the following paragraph.

The transmission assembly 40 includes a first rotor 42, a second rotor 44, a first rotor element seat 48a, and a second rotor element seat 48b. The first and second rotor element seats 48a and 48b are respectively and rotatably mounted on the first and second rotor spindles 26a and 26b. A rotor element 32 is removably provided on one of the first or second rotor element seats 48a and 48b for engaging and driving one of the reels 51 of the 8 mm video tape 50 when it is received in the recess 16. Both the first and second rotor element seats 48a and 48b have a plurality of slots 34 for engaging with a corresponding number of wings 36. For example, if the rotor element 32 engages with the first rotor element seat 48a, the 8 mm video tape 50 can be fast-forwarded when it is put into the adaptor. If the rotor element 32 is put onto the second rotor element seat 48b, the 8 mm video tape 50 can be rewound when it is put into the adaptor. Nevertheless, two rotor elements can be used without departing from the spirit of the invention.

Figure 8:
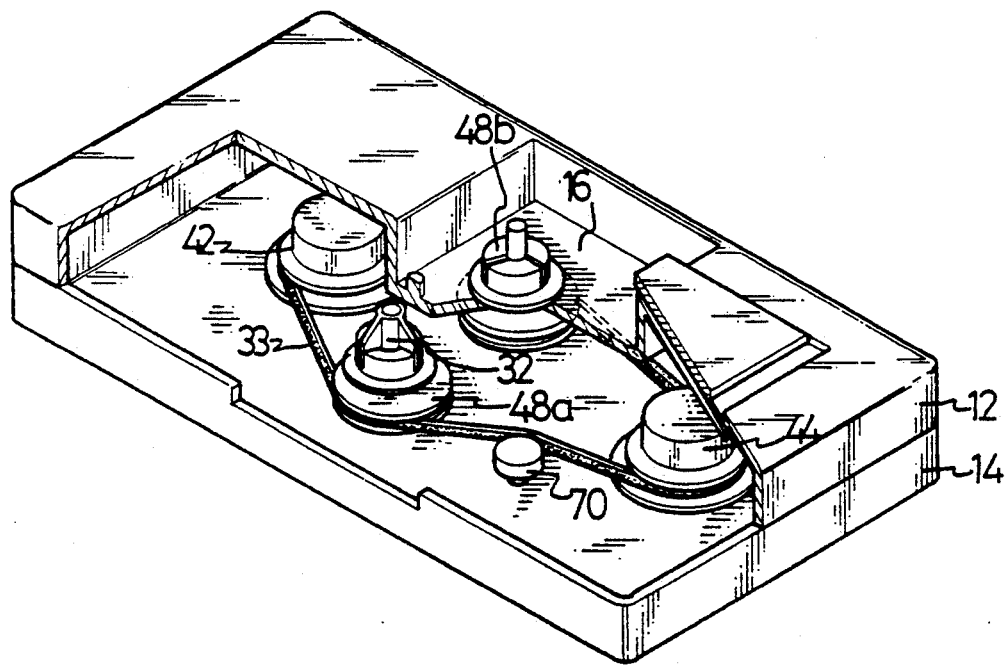
FIG. 8 is a schematic perspective view partially cutaway to show internal structure of the adaptor according to the present invention.

The first rotor 42 and the second rotor 44 are respectively and rotatably mounted in the third and fourth holes 46a and 48b. It is noted that the position of the third and fourth holes 46a and 46b are relative to that of a driving rotor wheel 61 and a follower rotor wheel 62 in a VHS video rewinder 60 (cf. FIG. 6). As shown in FIGS. 6 and 8, the first rotor 42, the second rotor 44, and the first and second rotor element seats 48a and 48b each have a pulley structure at a lower portion thereof and are mechanically connected by a belt 33 around the pulley structures.

Figure 7:
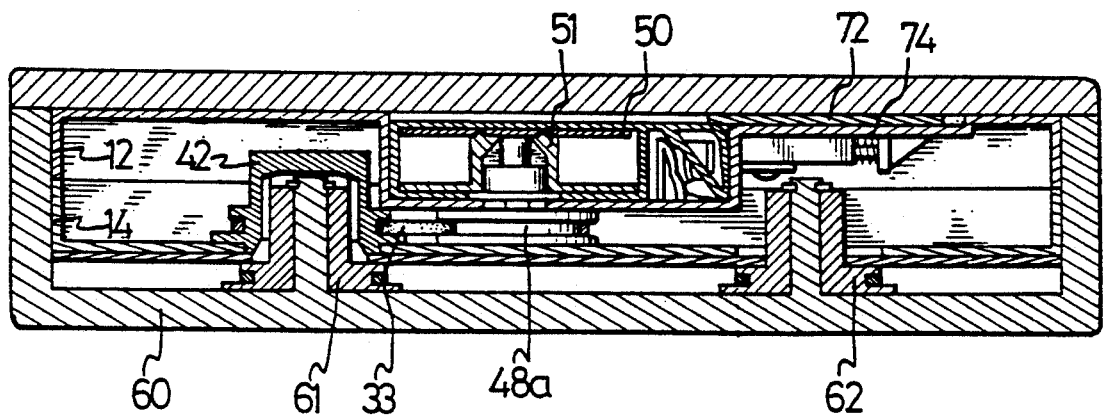
FIG. 7 is a cross-sectional view in which the 8 mm video tape is received in the adaptor, which in turn is received in a VHS rewinder for rewinding the 8 mm video tape.

Referring now to FIG. 7, in which the second rotor 44 and its corresponding retaining member 38 are omitted here for clarity, when the 8 mm video tape 50 is put into the recess 16 of the upper housing 12 of the adaptor, the two reels 51 respectively engage with the first and second rotor element seats 48a and 48b (please note that the rotor element 32 is on the first rotor element seats 48a). As soon as the adaptor is put into the VHS rewinder 60 for forwarding the 8 mm video tape 50, the driving rotor wheel 61 of the VHS rewinder 60 engages with and thereby drives the first rotor 42 of the adaptor. Accordingly, the belt 33 is driven, which in turn drives the first rotor element seat 48a and the rotor element 32, thereby fast-forwarding the 8 mm video tape 50. Rewinding of the 8 mm video tape 50 is substantially the same, except that the rotor element 32 16 engages with the second rotor element seat 48b.

Referring to back FIG. 8, the transmission means may further have a tension wheel 70 applied to the belt 33 at a middle portion between the first rotor element seat 48a and the second rotor 44 to increase the tension of the belt 33, thereby increasing transmission efficiency.

Figure 9:
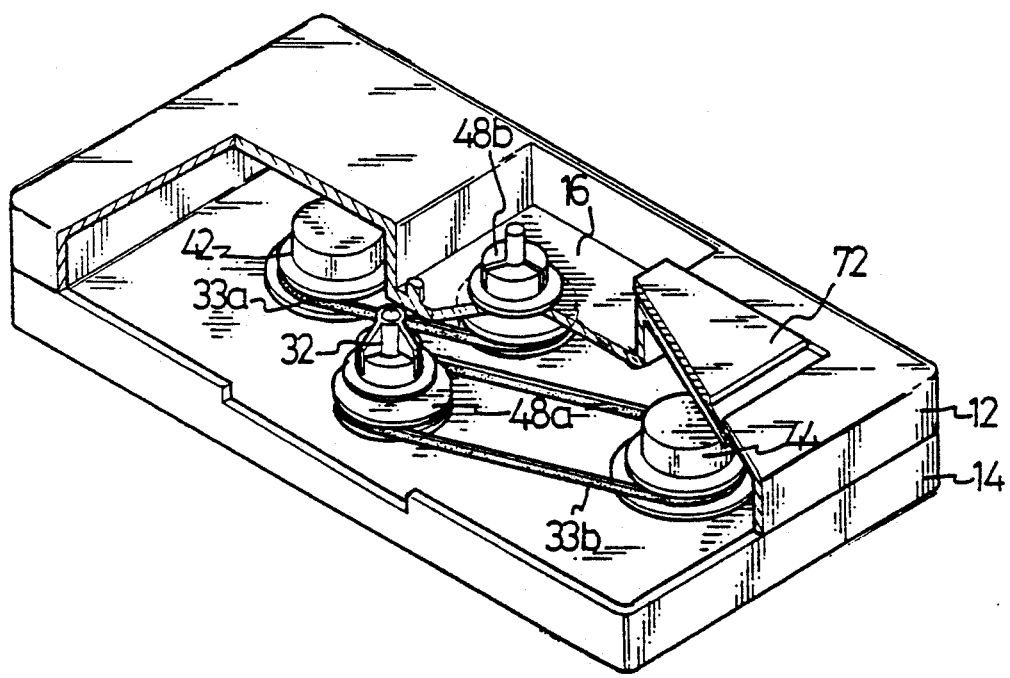
FIG. 9 is a schematic perspective view similar to FIG. 8 showing another design for the transmission assembly.

FIG. 9 shows an alternative design of the transmission assembly 40. As can be seen in this figure, the first rotor 42 engages with the second rotor element seat 48b via a first belt 33a, and the second rotor 44 engages with the first rotor element seat 48a via a second belt 33b.

Figure 10:
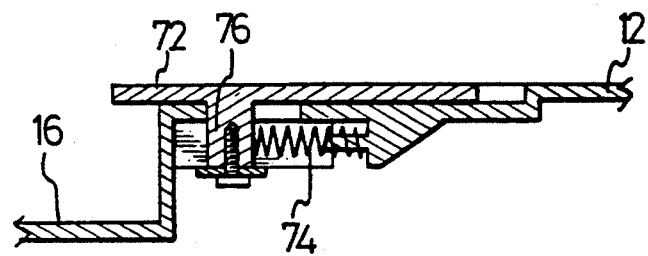
FIG. 10 is a fragmentary cross-sectional view showing a latch means of the present invention.

Referring back to FIG. 6 -and further to FIG. 10, the adaptor may further have a latch means for preventing the 8 mm video tape 50 from leaving the recess 16 during rewinding. The latch means includes a restraining plate 72 having a downward protrusion 76 movably mounted in the upper housing 12 along a horizontal direction and a spring 74 whose one end fixedly attached to the upper housing 12 and whose other end is attached to the downward protrusion 76 of the restraining plate 72. The restraining plate 72 is initially in a position shown in this figure. When inserting the 8 mm video tape 50 into the recess 16 for-rewinding or fast-forwarding, the restraining plate 72 is urged rightward (cf. FIG. 10) to allow insertion of the 8 mm video tape 50. Thereafter, the restraining plate 72 moves to its original position for restraining movement of the 8 mm video tape 50.

Incidentally, when the adaptor 10 is received in the VHS rewinder 60, an actuating member (not shown) of the VHS rewinder 60 which generally urges a stop means (not shown) of a, VHS video tape (not shown) is received in a recess 78 formed in the first rotor spindle 26a (cf. FIG. 6) via an underside of the lower housing 14, without interfering with the operation of the rewinding or fast-forwarding of the 8 mm video tape 50.

Figure 4:
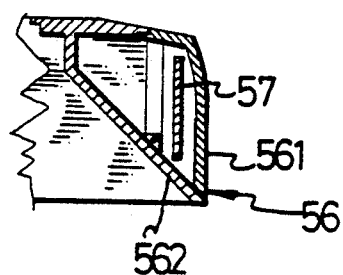
FIG. 4 is a fragmentary cross-sectional view taken along line 4—4 of FIG. 1.

Referring to FIGS. 4 and 5, conventionally, if the 8 mm video tape 50 is put into the 8 mm video tape rewinder 60, a lid means 56, consisting of two plates 561 and 562, of the 8 mm video tape 50 is opened by a means in the 8 mm video tape rewinder to prevent damage to the magnetic tape 57 caused by the lid means 56. However, the results of experiments by the applicant show that the magnetic tape 57 does not contact with the lid means 56 even though the lid means 56 is not opened. Therefore, the 8 mm video tape 50 can be placed into the adaptor according to the present invention and be thus rewound or fast-forwarded without damaging the magnetic tape 57.

Applicant has accomplished a sample. And tests show high stability and reliability of the present adaptor during operation.

Although the invention has been explained in relation to its preferred embodiment, it is to be understood that many other possible modifications and variations can be made without departing the spirit and scope of the invention as hereinafter claimed.

I claim:

1. An adaptor for rewinding or fast-forwarding an 8 mm video tape cassette having two reels and video tape in a Video Home System (VHS) video tape cassette rewinder having a first driving rotor wheel for rewinding and a second driving rotor wheel for fast-forwarding a VHS video tape, comprising:
   a rectangular housing having two spaced-apart long side walls and an upper side, said housing having dimensions substantially the same as those of a VHS video tape cassette and a transmission assembly in said housing, said housing adapted to be received in the Video Home System (VHS) video tape cassette rewinder and having a rectangular recess on the upper side thereof open to one of the long side walls for accommodating the 8 mm video tape cassette without the video tape coming in contact with any external object originating outside the 8 mm video tape cassette, said recess having an open top and open end for receiving and withdrawing the 8 mm video tape cassette from said recess, first and second rotor element seats extending upwardly from the recess to receive two reels of an 8 mm video tape cassette, the rotor element seats being drivable by said transmission assembly, said transmission assembly being drivable by one of the two driving rotor wheels of the VHS video tape cassette rewinder and a single rotor element selectively and removably mounted on one of said first and second rotor element seats operating as driver rotor element seat for engaging and driving one of the two reels of the 8 mm video tape cassette received in said recess, the rotor element mounted on one of the two rotor element seats to rewind the 8 mm video tape cassette and mounted on the other rotor element seat to fast-forward the 8 mm video tape cassette.

2. An adaptor for rewinding or fast-forwarding and 8 mm video tape cassette having two reels and a video tape in a VHS video tape cassette rewinder having a first rotor wheel as a driver rotor wheel and a second rotor wheel as a follower rotor wheel when the VHS video tape cassette rewinder is used for rewinding, and employing the second rotor wheel as a driver rotor wheel and the first rotor wheel as a follower rotor wheel when used for fast-forwarding a VHS video tape cassette, comprising:

a rectangular housing with two spaced-apart long side walls, said housing having dimensions substantially the same as those of the VHS video tape cassette and a transmission assembly in said housing, said housing having an upper housing with an upper side and a lower housing releasably connected to said upper housing, said upper housing having a recess on the upper side thereof open to one of the long side walls for accommodating the 8 mm video tape cassette without the video tape coming in contract with any external object originating outside the 8 mm video tape cassette, said recess having an open top and one open end for receiving and withdrawing the 8 mm video tape cassette from said recess, first and second holes being formed in a bottom surface of said recess, first and second rotor spindles extending upwardly from the upper side of said lower housing and respectively passing through aid first and second holes in said upper housing, said lower housing having third and fourth holes respectively positioned co-axially relative to the first rotor wheel and the second rotor wheel when the housing is received in the VHS video tape cassette rewinder;

said transmission assembly comprising first and second rotor element seats respectively rotatably mounted on said first and second rotor spindles, first and second rotors respectively rotatably mounted in said third and fourth holes, said first and second rotors adapted to be received respectively by the first rotor wheel and the second rotor wheel of the VHS video tape cassette rewinder, and a single rotor element selectively and removably mounted on one of said first and second rotor element seats operating as a driver rotor element seat for engaging and driving one of the two reels of the 8 mm video tape cassette received in said recess, the rotor element mounted on one of the two rotor element seats to rewind the 8 mm video tape cassette and mounted on the other rotor element seat to fastforward the 8 mm video tape cassette, said first rotor being at least mechanically connected to said second rotor element seat to drive same and said second rotor at least being mechanically connected to said first rotor element seat to drive same so that the 8 mm video tape cassette is rewindable or fast-forwardable by the corresponding driving motor wheel of the VHS video tape cassette rewinder.

3. The adaptor as claimed in claim 2, further comprising an actuating member extending upwardly from said bottom surface of said recess and which is adapted to be received in an opening in the 8 mm video tape cassette when the 8 mm video tape cassette is received in said recess to urge a stop means to unlock the reels of the 8 mm video tape cassette to a position allowing the 8 mm video tape cassette reels to rotate for rewinding or fast-forwarding of the 8 mm video tape cassette.

4. The adaptor as claimed in claim 2, further having a latch means on the housing for restraining the 8 mm video tape cassette in said recess during rewinding or fast-forwarding.

5. The adaptor as claimed in claim 2, wherein said first and second rotors and said first and second rotor element seats are mechanically connected by a drive belt so that said rotors and seats rotate in unison in the same rotational direction.

6. The adaptor as claimed in claim 2, wherein said first rotor and said second rotor element seat are mechanically connected by a first drive belt so that said first rotor and said second rotor element seat rotate in the same rotational direction, and said second rotor and said first rotor element seat are mechanically connected by a second drive belt so that said second rotor and said first rotor element seat rotate in the same rotational direction.

* * * * *